Patented Dec. 30, 1941

2,268,342

UNITED STATES PATENT OFFICE 2,268,342

INVOLUTE CHECKER

Joseph J. Osplack, Detroit, Mich., assignor to Vinco Corporation, Detroit, Mich., a corporation of Michigan Application August 2, 1940, Serial No. 349,587

12 Claims. (Cl. 33—174)

This invention relates to an involute checker for checking the accuracy of tooth profiles on involute gears, and particularly to an improved machine of this nature capable of checking gears of various sizes with a high degree of accuracy.

The object of the invention is to provide an improved involute gear checker of the type in which a support carrying an indicator point or stylus is so moved relative to a turning gear under test that the path traversed by the point relative to the gear is a true involute curve. The indicator point is held in contact with the profile of a tooth on the gear, and departure of the tooth profile from a true involute curve is detected by a sensitive instrument responsive to movement of the point relative to its support.

This type of involute checker is based on the fundamental geometrical property of the involute curve, namely, that as the base circle of the gear rotates, a point on a tangent to the base circle which moves along such tangent at the velocity of the base circle periphery follows the path of a true involute profile of a tooth on the base circle. Checkers based on this principle employ means for simultaneously turning the gear under test and moving the indicator point along a tangent to the base circle of the gear.

A particular object of the invention is the provision of an involute checker of the type generally described embodying improved means for simultaneously turning the gear under test and moving the indicator point, which means permits checking of gears of a wide range of sizes with a high and uniform degree of accuracy. Another object of the invention is to provide an improved indicator point support and indicating instrument assembly which is readily adjustable to check oppositely disposed tooth profiles and is at the same time highly accurate in its checking operation. Other objects include the provision of an involute gear checker which is quickly and easily adjustable to accommodate gears of different size without the necessity for complicated and time consuming re-setting operations.

Figure 1:
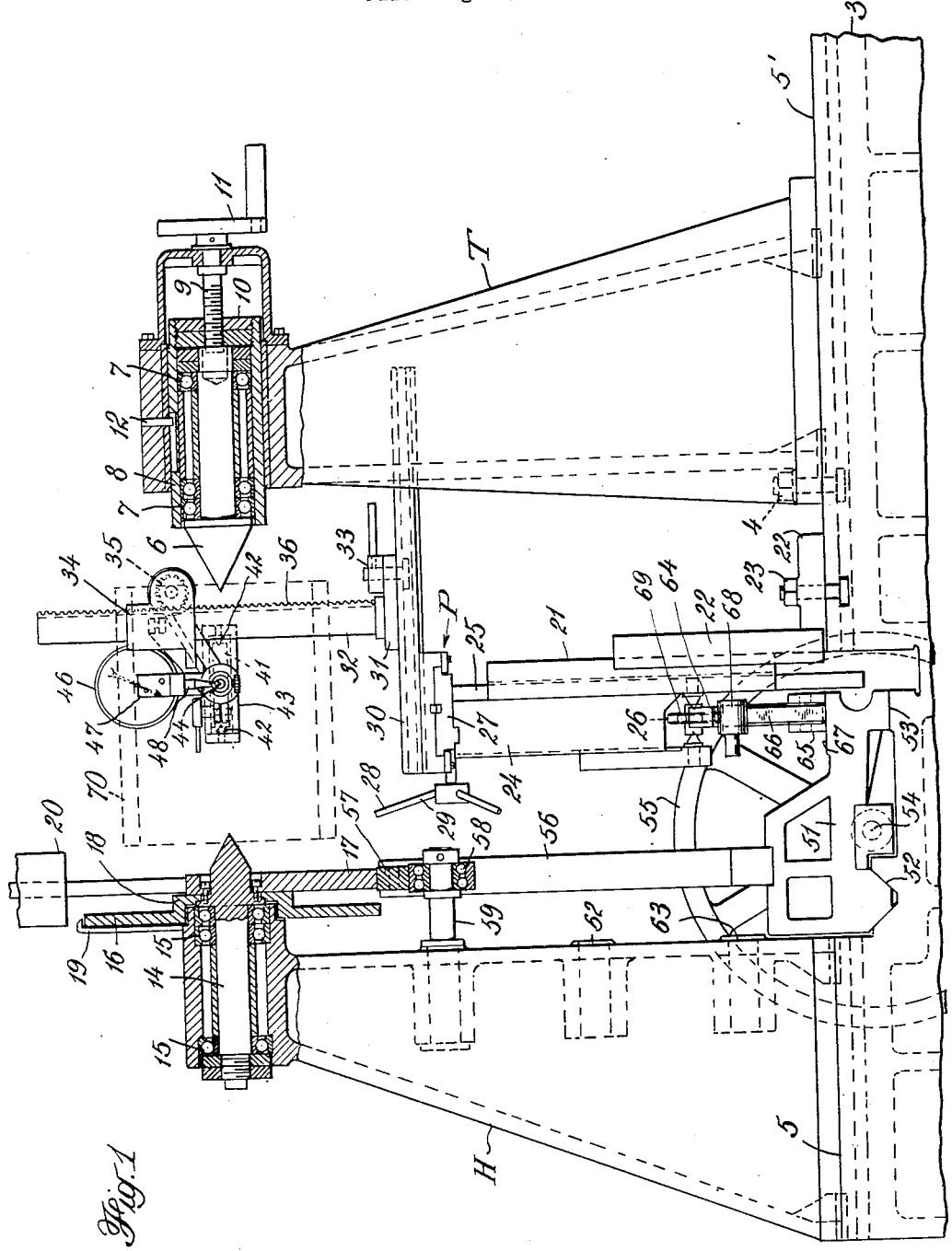
Figure 2:
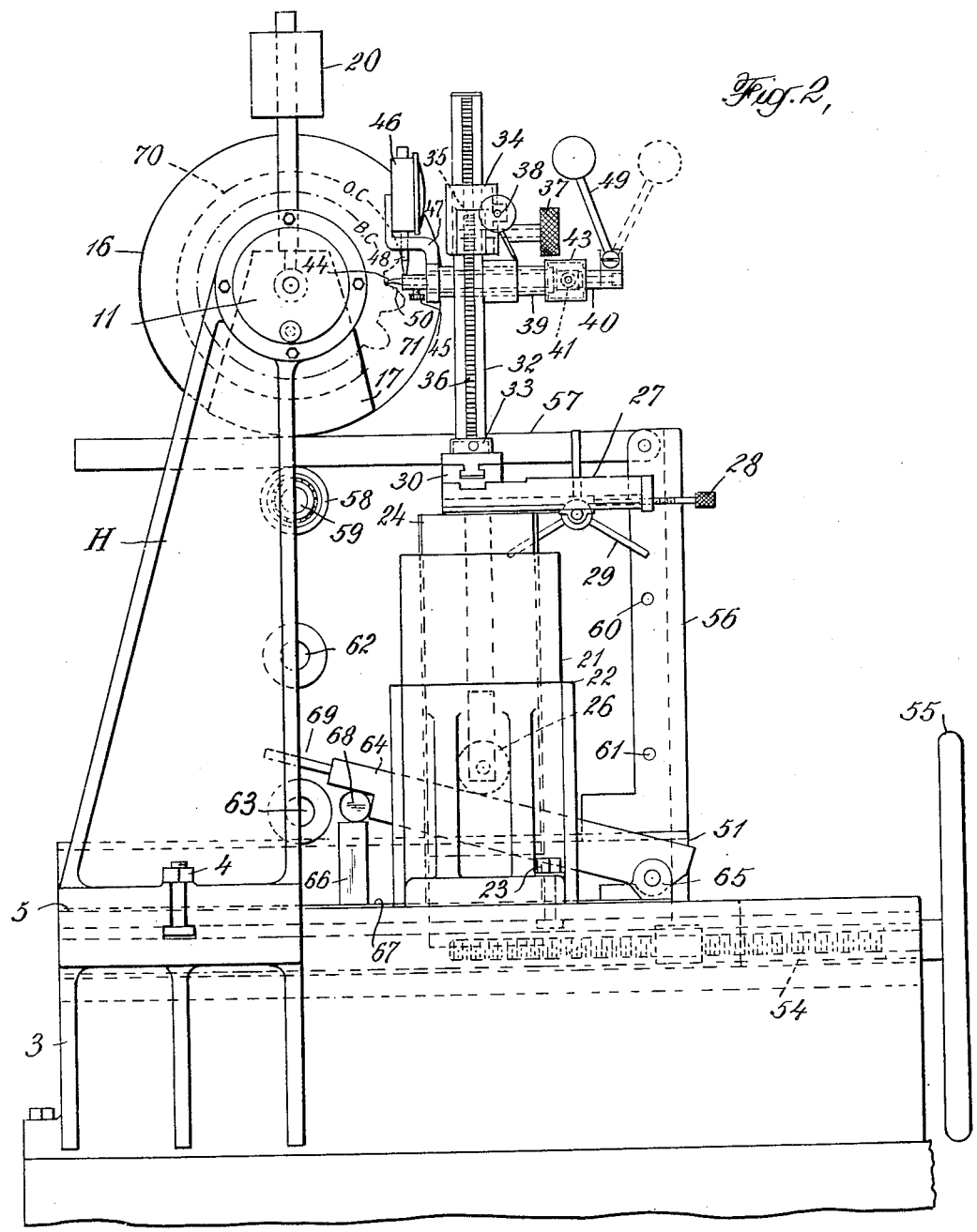

The invention will be best understood from the following detailed description of an involute checker comprising a specific embodiment thereof. This device is illustrated in the accompanying drawings, in which:

Figure 1 is a front elevation of an involute checker embodying the invention; and Figure 2 is a side elevation of the checker as viewed from the right of Figure 1, with the tail stock assembly removed.

The checker mechanism is mounted on a massive unitary bed 3 and comprises generally a head stock H, an indicator assembly P and a tail stock T. The bed 3 has spaced aligned horizontal ways 5 and 5' running lengthwise thereof to which the head stock H and the tail stock T are respectively clamped by suitable bolts 4. Gross adjustment of the tail stock T to accommodate gears of various axial length is obtained by movement of the tail stock along the ways 5'.

A live spindle 6, journaled in ball bearings 7, is carried in a sleeve 8 slidably mounted in the tail stock T. The sleeve and spindle are axially adjustable by means of a feed screw 9 engaging the nuts 10 at the outer end of the sleeve 8 and driven by a hand crank 11. Rotation of the sleeve 8 in the tail stock is prevented by engagement of a key 12 in an elongated slot in the sleeve. The work-engaging end of the spindle 6 comprises an accurately formed center point as shown. The head stock H carries a similar live spindle 14 journaled in ball bearings 15 and formed to an accurate center point at its work-engaging end.

A circular dial plate 16 is suitably fixed to the spindle 14 adjacent its center point. A stationary pointer 19 is fixed to the head stock and overlies the edge of the dial plate 16 which may be graduated in degrees so that the angle through which the gear is turned during a checking operation may be read.

A sectorial driving circle 17 is removably fixed to the spindle 14 by suitable means such as screws engaging a flange 18 on the spindle. The driving circle 17 carries an upwardly extending counterweight 20 which maintains the circle sector in balance as it turns with the spindle.

The indicator assembly P is mounted to slide vertically on a way 21 fixed to a bracket 22 which is clamped to the bed 3 by suitable means such as the bolt 23. A block 24 carries a slide 25 that engages the way 21. An anti-friction roller 26 is journaled between centers at the lower end of the block 24, as shown in Figure 1.

A plate 27 is slidably attached to the upper end of the block 24 and is adjustably movable transversely with the machine by a micrometer feed screw 28 (Figure 2). The plate 27 may be locked in any adjusted position by a suitable clamp operated by the hand wheel 29. A horizontal way 30 extending lengthwise of the machine is fixed to the plate 27 and carries a base 31 of the indicator support bar 32. The base 31 may be moved to various positions lengthwise of the machine by sliding it in the way 30, and may be locked in adjusted positions by a suitable locking bolt 33.

The indicator support proper includes a split collar 34 surrounding and slidable vertically along the bar 32. A pinion 35 journaled in an extension of the collar 34 and engaging a rack 36 on the bar 32 may be operated by a knob 37 to raise or lower the collar 34. A locking screw 38 is provided to clamp the collar to the bar after vertical adjustment.

The collar 34 carries a tubular casing 39 having its axis disposed horizontally and normal to the axis of the spindles 6 and 14. An indicator point supporting rod 40 extends loosely through the casing 39 and is pivoted adjacent the outer end of the casing. As shown, the point supporting rod 40 is fixed to a transverse horizontal shaft 41 journaled between suitable pivots 42 in a housing 43 extending transversely of and connected to the tubular casing 39 at its outer end. The indicator point 44 is so shaped that it contacts a tooth profile 50 at its outer end only, and is removably fixed in an opening in the inner end of the rod 40 by a set screw 45. A dial indicator 46 of known construction is supported above the indicator point by a bracket 47 fixed to the end of the casing 39, and the operating rod 48 of the dial indicator engages the rod 40 adjacent the indicator point 44.

The point supporting rod 40 extends through an opening in the outer wall of the pivot housing 43 and an upwardly extending weighted reversing lever 49 is pivotally secured to the outer end of the rod as shown. The parts are so proportioned that when the lever 49 is moved to its inward position as shown, its weighted end is substantially over the pivot shaft 41 and the indicator point 44 is pressed downwardly by the weight of the supporting rod 40 so that the point 44 is maintained in contact with an upwardly disposed tooth profile 50, as shown in Figure 2. When it is desired to check a downwardly disposed tooth profile, the point 44 is reversed so that its end will bear on such a profile, and the reversing lever 49 is swung outward to the position shown in broken lines in Figure 2. In this position, the weighted lever 49 overbalances the rod 40 and point 44 and so biases the point upwardly and maintains its end in contact with the downwardly disposed tooth profile being checked.

The indicator point and dial indicator supporting structure described permits accurate checking without complicated re-setting operations. This results from the location of the dial indicator operating rod 48 between the indicator point 44 and its pivot, and closer to the point than to the pivot. This arrangement maintains a downward pressure on the point pivot during checking of both upwardly and downwardly disposed tooth profiles, and thus obviates readjustment to compensate for play in the pivots. Also, false indications due to possible irregularities in the pivots are minimized because the lever arm between the pivot and the dial indicator operating rod 48 is long relative to that between the operating rod and the end of the point 44.

Improved mechanism is provided for simultaneously turning the gear being checked and moving the indicator point tangent to the base circle of such gear at a velocity equal to the peripheral velocity of the base circle. In the disclosed embodiment, this mechanism includes a carriage 51 slidably supported in ways 52 and 53 extending transversely of the bed 3. The line of movement of the bed is preferably horizontal and tangent to a circle centered on the axis of the gear supporting spindles 6 and 14. A feed screw 54 operated by a hand wheel 55 is provided for propelling carriage 51 along its ways. A vertically extending post 56 is fixed to the carriage 51 adjacent one end thereof, and a horizontal friction drive bar 57 is pivotally secured at one end to the post 56. The drive bar 57 is supported on a suitable roller such as the outer race of a ball bearing 58 carried by a stub shaft 59 removably fixed in an opening in the head stock H. The bearing 58 is so spaced relative to the driving circle 17 that the driving bar 57 is held in tight frictional engagement with the periphery of the driving circle. With this arrangement, horizontal movement of the bar 57 turns the circle 17 without slippage between these parts, and the pressure necessary to maintain this frictional engagement between the driving bar and the circle is transferred to the head stock H through the bearing 58. Accordingly, no drag is imposed on the carriage 51 by transmission of this pressure to the carriage ways 52 and 53.

The friction driving bar 57 may be moved to various vertically spaced positions to engage driving circles of different diameter, and in this manner, the relation between the angular velocity of the head spindle 14 and the horizontal velocity of the carriage 51 may be altered. The change in position of the bar 57 is made by moving its pivotal connection to one of the openings 60 and 61 in the post 56 and moving the ball bearing stub shaft 59 to the corresponding opening 62 or 63 in the head stock H.

The indicator carriage 51 carries a sine bar 64 pivotally connected to the carriage at 65. The bar 64 is movable to various angular positions in a vertical plane passing through the line of movement of the carriage 51. The sine bar has a plane upper surface on which the indicator assembly P is supported through engagement of the roller 26 with this surface. The sine bar 64 may be disposed at various angles relative to the horizontal line of movement of the carriage 51 by placing an accurately dimensioned support such as a Johannsen block 66 on a true horizontal surface 67 of the carriage 51 beneath the free end of the sine bar. A cylindrical button 68 is fixed to the undersurface of the sine bar 64 adjacent its free end to provide true and uniform engagement with blocks of various height. A handle 69 may be provided at the free end of the sine bar for lifting it while various blocks are placed beneath its free end.

To check a gear tooth profile with the described checker, a driving circle 17 having a radius preferably larger than that of the gear 70 under test is fixed to the spindle 6 and the gear is centered between the points of the spindles 6 and 14. A Johannsen block 66 of the proper height is placed on the horizontal carriage surface 67 under the button 68 of the sine bar 64. The height of the block 66 used is so chosen as to dispose the sine bar at a predetermined angle to the horizontal. This angle is such that upon horizontal movement of the carriage 51, the indicator assembly P will be raised or lowered at a linear velocity equal to the peripheral velocity at which the base circle of the gear under test is turned by such carriage movement. This angle may be readily calculated since its tangent is equal to the base circle diameter of the gear under test divided by the diameter of the driving circle 17. The block height required to produce this angle may be determined by multiplying the sine of the angle by the length of the hypotenuse formed by the sine bar.

With the proper block 66 in place, the indicator support is adjusted to place the end of the indicator point 44 in contact with the upwardly disposed tooth profile 50 at the base circle of the gear, this point of contact being in a horizontal plane passing through the center line of the spindles 6 and 14. The vertical position of the indicator support collar 34 is adjusted until the point support rod 40 is free to move in its tubular casing 39. The carriage 51 is then moved outward by the hand wheel 55, and this carriage movement both turns the gear 70 counterclockwise as viewed in Figure 2 and lifts the indicator point support vertically. During this movement, the direction and magnitude of any departure of the tooth profile 50 from a true involute curve is indicated by the dial indicator 46. When checking a downwardly disposed tooth profile, such as the profile 71 on the same gear, the sine bar setting is not changed and the same driving circle is employed. The point 44 and the lever 49 are reversed and the carriage 51 is moved inwardly to rotate the gear clockwise as viewed in Figure 2 and to lower the indicator point.

By substituting larger diameter driving circles for the circle 17, large diameter gears may be checked without resort to excessive sine bar angles. If, for example, the gear under test has a base circle diameter greater than that of the driving circle, the sine bar angle would necessarily be greater than 45° and the sensitivity and accuracy of movement of the indicator point support would be impaired. By changing to a larger diameter driving circle however, the sine bar angle may be kept within a range at which maximum sensitivity and accuracy of movement of the indicator point support is maintained.

I claim:

1. In an involute checker, in combination, a rotatable gear supporting spindle having a fixed substantially horizontal axis of rotation, an indicator point support movable along a substantial vertical line tangent to a circle centered on said axis, means for simultaneously rotating said spindle and moving said indicator point support comprising a carriage disposed below said indicator point support and said spindle axis and movable horizontally along a line normal to a vertical plane through said axis, means connected to said carriage for rotating said spindle upon movement of said carriage, a bar pivotally secured adjacent one of its ends to said carriage and movable about its pivot in a vertical plane parallel to the line of movement of said carriage, a block removably disposed beneath said bar whereby said bar is disposed at an angle to the line of movement of said carriage, and means on said indicator point support engaging said bar whereby horizontal movement of said carriage moves said indicator point support vertically.

2. In an involute checker, in combination, a base, a vertically extending support fixed to said base, a horizontal gear supporting spindle rotatably mounted on said support, a driving circle removably fixed to said spindle adjacent said support, a carriage on said base below said spindle and movable along a line tangent to a circle centered on the axis of rotation of said spindle, a horizontally extending driving bar pivotally connected to said carriage and engaging the periphery of said driving circle adjacent said support, a roller carried by said support and engaging said driving bar to hold said bar in frictional engagement with the periphery of said driving circle, vertically spaced means on said carriage and said fixed support for supporting said driving bar and said roller at different vertically spaced positions whereby said bar may cooperate with driving circles of different diameters, an indicator point support carried by said base and movable vertically along a line adjacent the axis of said spindle, a sine bar pivotally secured to said carriage and movable to various angular positions in a vertical plane passing through the line of movement of said carriage, a block removably disposed between said sine bar and said carriage for holding said sine bar at a predetermined angle to the line of movement of said carriage and means on said indicator point support engaging said sine bar whereby horizontal movement of said carriage moves said indicator point support vertically.

3. In an involute checker, in combination, a fixed support, a horizontal gear supporting spindle rotatably mounted on said support, a carriage on said support below said spindle movable along a horizontal line, a driving connection between said carriage and said spindle for rotating said spindle upon movement of said carriage, a sine bar pivotally secured at one end to said carriage and movable in a vertical plane through the line of movement of said carriage to positions at various angles to the horizontal, a block removably disposed between said carriage and said bar for holding said bar at a predetermined angle to the horizontal, and an indicator point support movable vertically along a line adjacent the axis of said spindle and supported by said sine bar whereby horizontal movement of said carriage moves said indicator point support vertically.

4. In an involute checker, in combination, a fixed support, a horizontal gear supporting spindle rotatably mounted on said support, a carriage on said support below said spindle movable along a horizontal line, a driving connection between said carriage and said spindle for rotating said spindle upon movement of said carriage, a sine bar pivotally secured at one end to said carriage and movable in a vertical plane through the line of movement of said carriage to positions at various angles to the horizontal, a cylindrical surface on said sine bar adjacent its free end having its axis parallel to the pivot axis of said bar, a block removably disposed between said carriage and said cylindrical surface for supporting said bar at a predetermined angle to the horizontal and an indicator point support movable vertically along a line adjacent the axis of said spindle and supported by said sine bar whereby horizontal movement of said carriage moves said indicator point support vertically.

5. In an involute checker, in combination, a fixed support, a horizontal gear supporting spindle rotatably mounted on said support, a carriage on said support below said spindle movable along a horizontal line, a driving connection between said carriage and said spindle for rotating said spindle upon movement of said carriage, a sine bar pivotally secured at one end to said carriage and movable in a vertical plane through the line of movement of said carriage to positions at various angles to the horizontal, a cylindrical surface on said sine bar adjacent its free end having its axis parallel to the pivot axis of said bar, a block removably disposed between said carriage and said cylindrical surface for supporting said bar at a predetermined angle to the horizontal, an indicator point support movable vertically along a line adjacent the axis of said spindle and a roller connected to said indicator point support and engaging said sine bar whereby horizontal movement of said carriage moves said indicator point support vertically.

6. In an involute checker, in combination with means for rotating a gear to be checked about a fixed axis, a support and means for moving said support along a vertically extending tangent to a circle centered on said axis, means carried by said support for checking a tooth on a gear carried by said rotating means comprising an elongated element pivotally connected to said support and extending horizontally from its pivotal connection toward said fixed axis for engagement at its free end with a tooth on a gear being checked, a precision measuring instrument fixed to said support and a movable operating member on said instrument engaging said elongated element between its pivot and its free end and at a point substantially closer to its free end than its pivot.

7. In an involute checker, in combination with a vertical movable support and means for simultaneously moving said support vertically and rotating a gear to be checked about a fixed horizontal axis adjacent said support, means carried by said support for checking the shape of a tooth profile on a gear rotated about said axis comprising an elongated horizontally extending member having a gear tooth engaging point at one end thereof, a substantially horizontal pivot connecting said elongated member to said support at a point thereon remote from said tooth engaging point, and a dial indicator fixed to said support and having a vertically movable operating rod engaging said elongated member close to said tooth engaging point and remote from said pivot.

8. In an involute checker, in combination with a vertical movable support and means for simultaneously moving said support vertically and rotating a gear to be checked about a fixed horizontal axis adjacent said support, means carried by said support for checking the shape of a tooth profile on a gear rotated about said axis comprising an elongated horizontally extending member having a gear tooth engaging point at one end thereof, a substantially horizontal pivot connecting said elongated member to said support adjacent the end thereof remote from said tooth engaging point, a precision measuring instrument fixed to said support and having a vertically movable operating element engaging said elongated member, and a weight on said elongated member movable longitudinally thereof from a position at which said tooth engaging point is biased upwardly to a position at which said point is biased downwardly.

9. In an involute checker, in combination with a vertical movable support and means for simultaneously moving said support vertically and rotating a gear to be checked about a fixed horizontal axis adjacent said support, means carried by said support for checking the shape of a tooth profile on a gear rotated about said axis comprising an elongated horizontally extending member having a gear tooth engaging point at one end thereof, a substantially horizontal pivot connecting said elongated member to said support adjacent the end thereof remote from said tooth engaging point, a dial indicator fixed to said support and having a vertically movable operating rod engaging said elongated member between said pivot and said tooth engaging point and adjacent said point, and a lever movably connected to said elongated member adjacent said pivot and having a weighted end movable longitudinally of said member from a position at which said tooth engaging point is biased upwardly to a position at which said point is biased downwardly.

10. An indicator point support for an involute checker comprising an elongated member having a gear tooth engaging point at one end thereof and a pivot spaced longitudinally of said member from said point, a precision measuring instrument fixed relative to said member and having a movable operating element engaging said member adjacent said point and movable upon movement of said member about said pivot and means for biasing said member to turn in either direction about said pivot.

11. An indicator point support for an involute checker comprising an elongated member having a gear tooth engaging point at one end thereof and a pivot spaced longitudinally of said member from said point, a precision measuring instrument fixed relative to said pivot and having a movable operating element engaging said member adjacent said point and movable upon movement of said member about said pivot means for supporting said instrument and said pivot in relatively fixed position and a weight on said member movable horizontally relative to said pivot for biasing said member to turn in either direction about said pivot.

12. In an involute checker, in combination, a base, a vertically extending support fixed to said base, a horizontal gear supporting spindle rotatably mounted on said support, a driving circle removably fixed to said spindle adjacent said support, a carriage on said base below said spindle and movable along a line tangent to a circle centered on the axis of rotation of said spindle, a horizontally extending driving bar pivotally connected to said carriage and engaging the periphery of said driving circle adjacent said support, a sine bar pivotally secured to said carriage and movable to various angular positions in a vertical plane passing through the line of movement of said carriage, a block removably disposed between said sine bar and said carriage for holding said sine bar at a predetermined angle to the line of movement of said carriage and means on said indicator point support engaging said sine bar whereby horizontal movement of said carriage moves said indicator point support vertically.

JOSEPH J. OSPLACK.